United States Patent [19]
Lee et al.

[11] Patent Number: 6,166,737
[45] Date of Patent: Dec. 26, 2000

[54] QUICK INPUT DEVICE FOR WINDOW SELECTION LIST CONTROL SIGNAL OF NOTEBOOK-TYPE COMPUTER

[75] Inventors: Chia-Chun Lee; Ming-Hsun Chou; Chia-Fen Chi, all of Taipei, Taiwan

[73] Assignee: Compal Electronics, Inc., Taipei, Taiwan

[21] Appl. No.: 09/205,357

[22] Filed: Dec. 4, 1998

[51] Int. Cl.[7] .................................................... G06F 9/00
[52] U.S. Cl. .......................... 345/343; 345/173; 345/352; 345/168
[58] Field of Search ................................... 345/145, 146, 345/157, 168, 169, 172, 173, 333, 334, 339, 347, 352, 343; 364/708.1, 709.01, 709.14, 709.15; 361/680, 686

[56] References Cited

U.S. PATENT DOCUMENTS

| | | | |
|---|---|---|---|
| 5,898,424 | 4/1999 | Flannery | 345/173 |
| 5,910,802 | 6/1999 | Shields et al. | 345/347 |
| 5,912,667 | 6/1999 | Chang | 345/347 |
| 6,020,877 | 2/2000 | Smith | 345/157 |

*Primary Examiner*—Raymond J. Bayerl
*Assistant Examiner*—Cao H. Nguyen
*Attorney, Agent, or Firm*—Bacon & Thomas, PLLC

[57] ABSTRACT

A quick input device for window selection list control signal of notebook-type computer, which includes a window selection list control key arranged under an input section of a track-controlling device of the notebook-type computer. The control key serves to control the change of window selection items and enables a user to directly and quickly change the window selection items of the notebook-type computer.

1 Claim, 3 Drawing Sheets

QUICK INPUT DEVICE FOR WINDOW SELECTION LIST CONTROL SIGNAL OF NOTEBOOK-TYPE COMPUTER

BACKGROUND OF THE INVENTION

The present invention relates to a quick input for window selection list control signal of notebook-type computer, which includes a window selection list control key arranged under an input section of a track-controlling device of the notebook-type computer. The control key enables a user to directly and quickly change the window selection items of the notebook-type computer.

Most of the existing application programs are window-type programs. One of the important characters of the window-type programs resides in that a window selection list is hidden under different operation selection items. The window selection list enables a user to more quickly select an item of the list. However, when the notebook-type computer executes the change of the window selection items, a user must first move the cursor into the window selection list for controlling the change of the window selection items. The change of the window selection items is accomplished by means of a track-controlling device such as a track panel or a track ball.

It is quite troublesome to move the cursor by means of the track panel or a mouse by reason that the cursor may be positioned at any place of the computer screen. The window selection list is located on upper side of the computer screen so that the cursor may be far away from the window selection list. Therefore, it is quite inconvenient and time-consuming to execute the change of the window selection items of the notebook-type computer.

SUMMARY OF THE INVENTION

It is a primary object of the present invention to provide a quick input device for window selection list control signal of notebook-type computer, which includes a window selection list control key arranged under an input section of a track-controlling device of the notebook-type computer. The control key enables a user to more conveniently and quickly change the window selection items of the notebook-type computer.

The present invention can be best understood through the following description and accompanying drawings, wherein:

DETAILED DESCRIPTION OF THE PREFERRED EMBODIMENT

Figure 1:
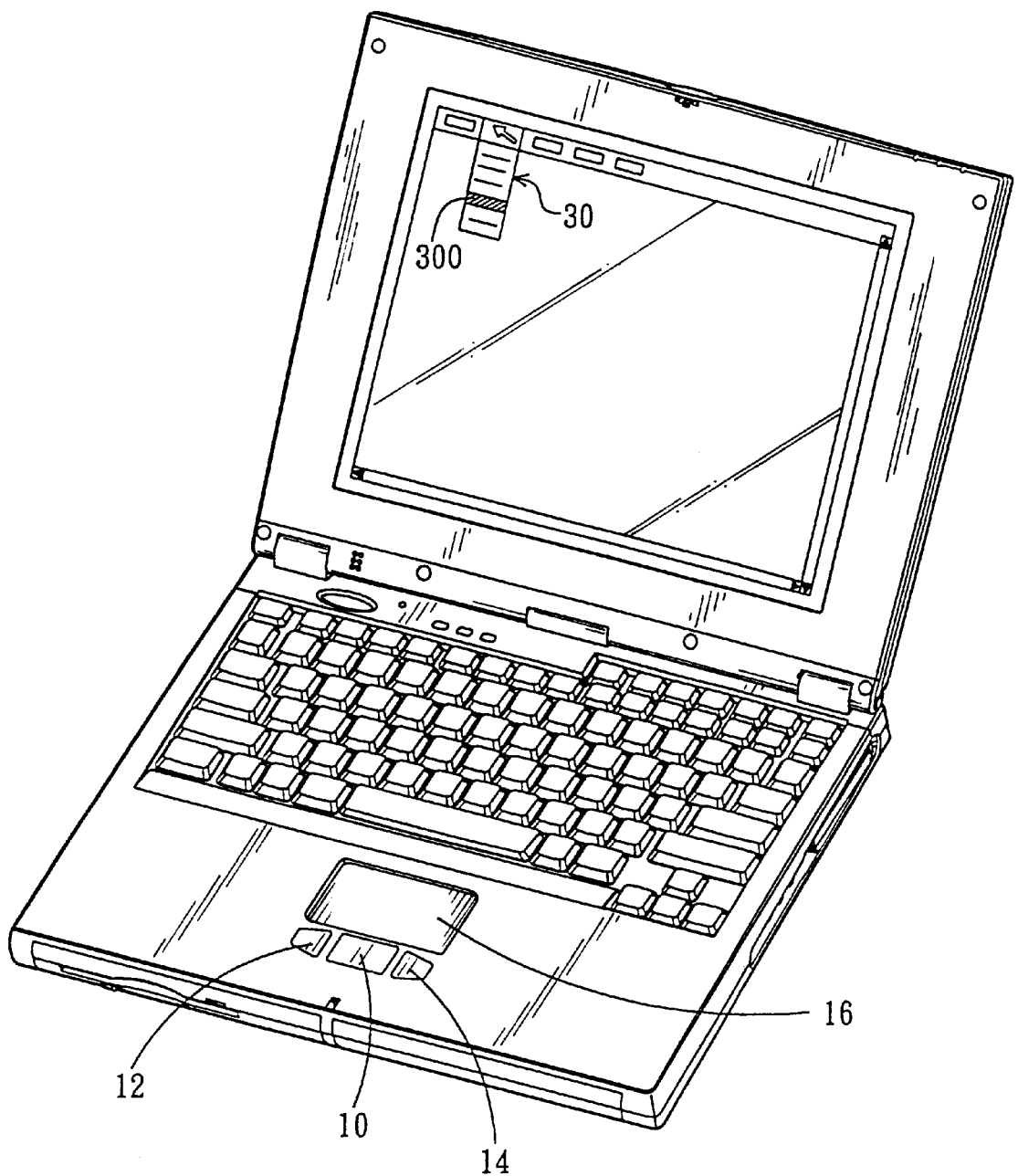
FIG. 1 is a perspective view of a notebook-type computer with the window selection list control key of the present invention.

Please refer to FIG. 1. According to the present invention, a window selection list control key 10 is arranged between a left and a right control keys 12, 14 under an input section of a track-controlling device 16 (track panel or track ball) of a notebook-type computer. The left and right control keys 12, 14 and the track-controlling device 16 pertain to prior art and will not be further described hereinbelow.

Figure 2:
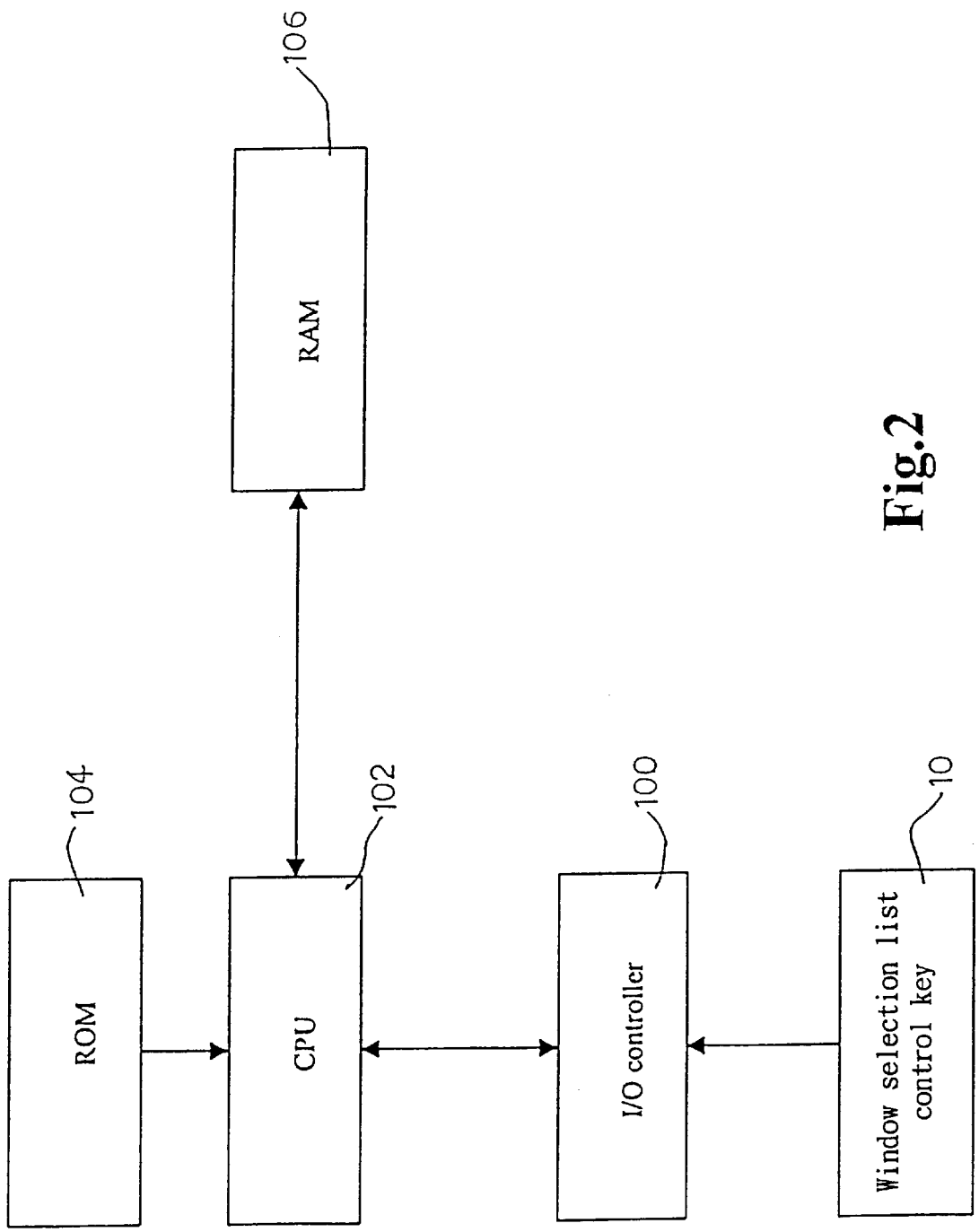
FIG. 2 is a block circuit diagram of the present invention.

The present invention is characterized in the window selection list control key 10. Referring to FIG. 2, the control key 10 is electrically connected with an I/O controller 100 which is electrically connected with a central processor unit (CPU) 102. The CPU 102 is further connected to an ROM 104 and an RAM 106 and other relevant components.

Figure 3:
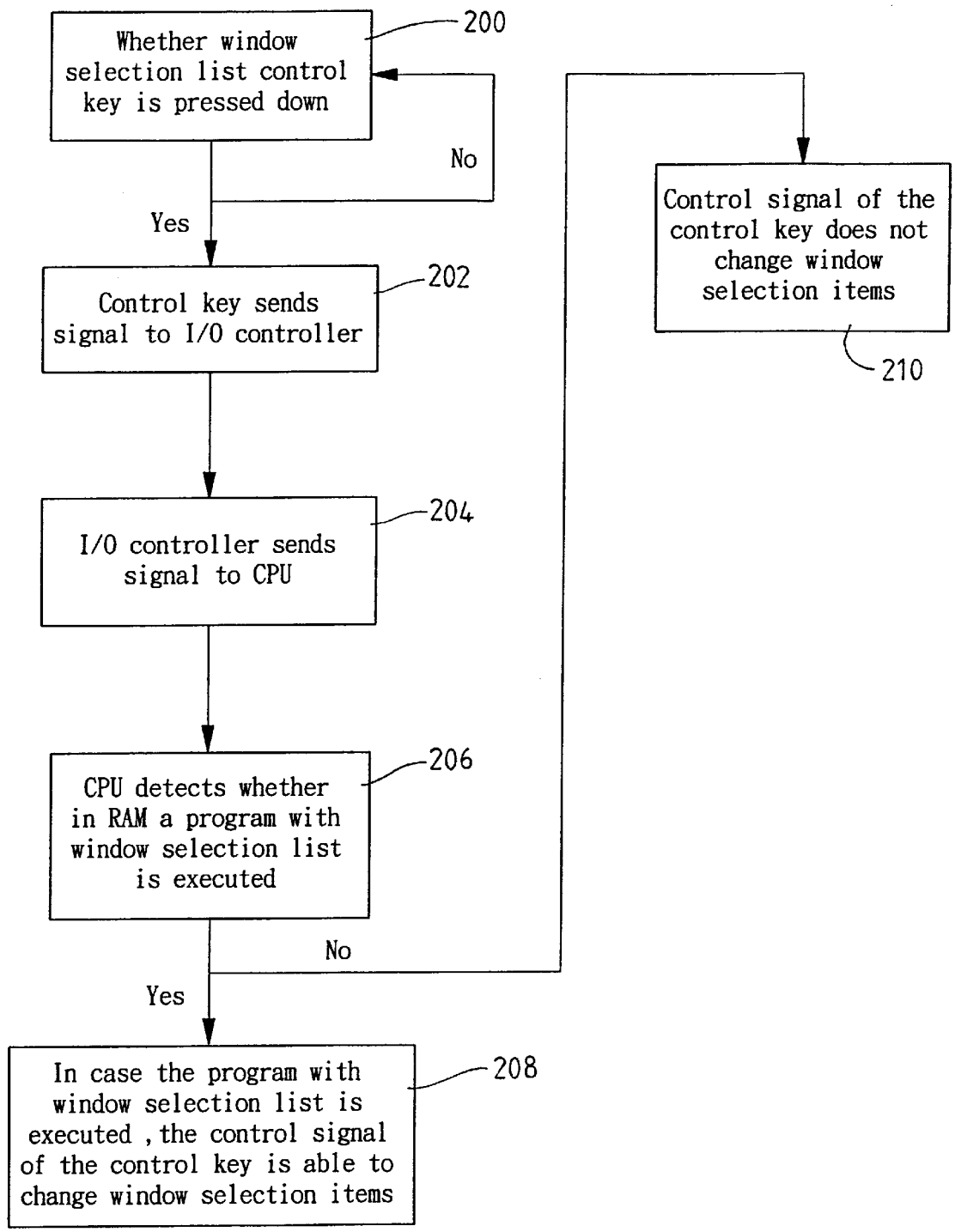
FIG. 3 is a flow chart of the operation of the present invention.

When a user selects a selection item 300 of a window selection list 30 under a window type application program (referring to FIG. 1), the present invention enables the user to more quickly and conveniently change the selection item 300. Referring to FIG. 3, the controlling flow chart of the window selection list control key 10 is as follows:

First, the CPU 102 detects whether the control key 10 is pressed down in step 200. If so, a signal is sent to the I/O controller 100. Then, the I/O controller 100 sends a signal to the CPU 102 in step 204. The CPU 102 detects whether an execution program with the window selection list 30 in the RAM 106 is executed in step 206. The detection is performed in a manner which will be described in the next paragraph. In case that the execution program with the window selection list 30 is executed, then the window selection list 30 is controlled by the window selection list control key 10 for changing the selection item 300 in step 208. In case the CPU 102 does not detect the execution of the program with the window selection list 30, then the signal of the control key 10 will not affect any function of the execution program in step 210.

The CPU 102 detects whether there in a program with the window selection list 30 in the RAM 106 via an operation system which executes an identified work. This is because that when the operation system executes the program with the window selection list 30, the operation system will make a denotation with a relevant flag. Therefore, when the window selection list control key 10 via a driving program communicates with the operation system, the operation system will judge whether the flag is set. In case the flag is not set, then even though the control key 10 is pressed down, the current program will not be affected. In case the flag is set, then the control key 10 can change the window selection item 300 of the execution program.

It should be noted that the above description and accompanying drawings are only used to illustrate one embodiment of the present invention, not intended to limit the scope thereof. Any modification of the embodiment should fall within the scope of the present invention.

What is claimed is:

1. A quick input device for window selection list control signal of notebook-type computer, which is characterized in that a window selection list control key is arranged under an input section of a track-controlling device of the notebook-type computer, the control key being electrically connected with an I/O controller which is electrically connected with a central processor unit, the control key serving to control the change of window selection items of a window-type program and enable a user to directly and quickly change the window selection items of the notebook-type computer; and the central processor unit is connected to an RAM and serves to detect the depression of the window selection list control key and then detect whether a program with the window selection list in the RAM is executed, if so, the window selection items being controlled by the window selection list control key to change the selection item, if not, the signal of the control key will not affect any function of the execution program.

* * * * *